(No Model.)
W. H. THOMAS.
FIELD ROLLER.
No. 307,503. Patented Nov. 4, 1884.
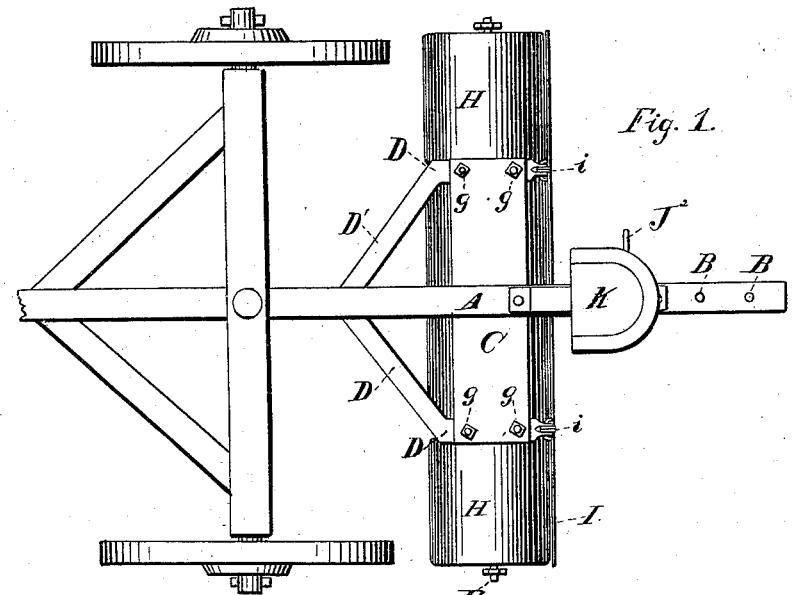
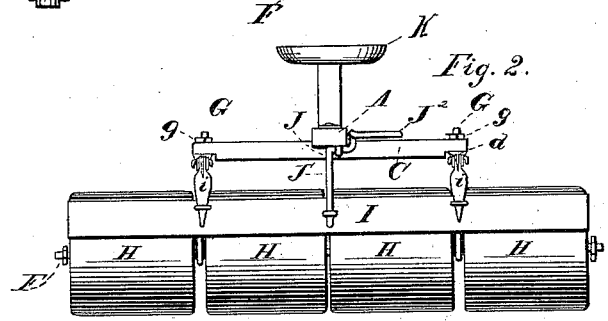
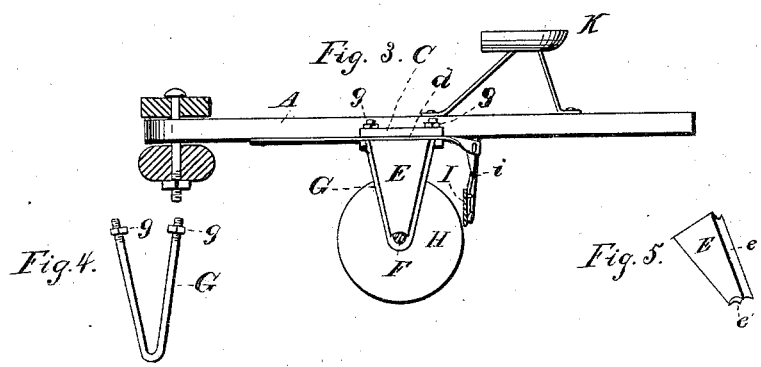
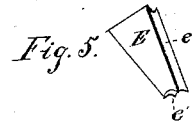
Witnesses.
P. B. Turpin,
O. M. Kramer
Inventor.
William H. Thomas
By R. S. & A. P. Lacey, Att'ys.

UNITED STATES PATENT OFFICE.

WILLIAM H. THOMAS, OF FULTON, MISSOURI.

FIELD-ROLLER.

SPECIFICATION forming part of Letters Patent No. 307,503, dated November 4, 1884.

Application filed May 23, 1884. (No model.)

*To all whom it may concern:*

Be it known that I, WILLIAM H. THOMAS, a citizen of the United States, residing at Fulton, in the county of Callaway and State of Missouri, have invented certain new and useful Improvements in Field-Rollers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to land or field rollers, and has for its object convenient means whereby the weight or pressure of the roller may be increased or diminished at will, and novel devices enabling the simple, economical, and strong construction of the machine.

It consists in the novel construction, combination, and arrangement of the several parts, as will be hereinafter more fully described and claimed.

In the drawings, Figure 1 is a plan view, Fig. 2, a rear elevation, and Fig. 3 a side elevation, part in section, of a machine constructed according to my invention, and Figs. 4 and 5 are detail views, all of which will be hereinafter described.

The coupling or draft pole A has an opening formed through it near its forward end, and is provided with a series of openings, B, extending from its rear end to about its middle portion. I secure this pole midway its ends centrally on the cross top beam, C. A trace-frame, D, has arms D', which are carried from near the ends of the cross-beam at an incline forward, and converge and are secured to the coupling-pole in advance of the cross-beam. The arms of this frame are also extended at *d* under the cross-beam and slightly in rear thereof, as shown most clearly in Figs. 1 and 3, for the purposes presently described.

The standards E are preferably made of cast-iron and in the approximately triangular form shown. They are provided on the front and rear edges with grooves *e*, and have the bearings *e'* formed in their lower ends, in which to clamp the axle or shaft F by means of the clamping-loop G. The loop G is made by preference of a wrought-iron rod bent into the form shown, and having its opposite ends threaded to receive the nuts *g*.

In constructing the roller the roller-sections H are placed on the axle F in the manner clearly shown. The standards are then placed with their lower bearing ends, *e'*, on the axle between the outer rollers and the next inner ones, and their upper ends resting against the ends of the arms of frame D and under the cross-beam. The clamping-loops are then applied, as shown in Fig. 3, with the loop or bend therein binding the axle F firmly into the bearing *e'*, its arms resting snugly in grooves *e*, and the ends thereof being inserted through suitable holes in the frame D and the cross-beam and secured by the nuts *g*, turned on the threaded ends of the arms down against the upper side of the cross-beam. By tightening these nuts the parts may be clamped rigidly together. It will also be seen that these nuts may be tightened up to take up the wear on the bearings at their lower ends, so that the rollers may run smoothly and without jar at all times.

By the arrangement of the ends of the brace-frame, it will be seen, the clamping-loop serves to unite the standard, the cross-beam, the axle, and the brace-frame, and the arms of the latter serve as wear-guards for the arms of the loop-clamp, as will be appreciated.

A scraper, I, is suspended by hangers *i*, pivoted to the rear ends of the brace-frame, so that the said scraper may be pressed against and clean the rollers. A crank-rod, J, is pivoted to the coupling-pole and has one arm, J', extended down and connected with the scraper, and its other arm, J², is bent laterally in position to be engaged by the foot of the driver, so that the scraper may be forced at will against the rollers. This scraper, it will be noticed, is so hung that it will ordinarily hang clear of the rollers, as will be seen from Fig. 3. The seat K is adjustable along the coupling-pole preferably by means of the bolts passed through its supports and the desired ones of the series of bolt-holes B. It is manifest the seat could be adjustably secured or supported in various ways other than that shown and described, though I prefer said construction. The object of this adjustment will appear hereinafter.

It will be observed that the coupling-pole and general framing of my machine about balance or pivot evenly on the axle, and that additional weight on the rear of the coupling-pole will destroy this equilibrium.

In practice I design to use my roller in connection with the front wheels of an ordinary wagon running-gear, the king-bolt passing through the hole in the forward end of the draft-pole. As the driver's seat is adjusted rearwardly from the rollers the front end of the pole is pressed up against the sand-board of the wheel-frame, and the weight of the cart by this means is transfered to the roller to an extent comparative with the rear adjustment of the seat, as will be understood from Figs. 1 and 3. In Fig. 1, I show the wheels, sand-bar, axle, and hounds of the wheel-frame, and in Fig. 3 I show the axle and sand-bar. This seems sufficient to illustrate the idea of the invention. By this construction, it will be seen, I am able to easily vary the pressure on the rollers as is frequently desirable.

For light rolling a tongue may be attached to the coupling-pole and the carriage dispensed with. This will not prevent the adjustment of the weight to the extent of the weight of the pole.

It will be seen that a drill could be substituted for the form of carriage shown. In this case I exchange the smooth roller-section for corresponding sections corrugated circumferentially. By such arrangement the advantage to the wheat crop will be equal to the drill over broadcast sowing, as the corrugations in the rollers will compress the ground, and at the same time leave the drill-furrows intact.

Having thus described my invention, what I claim, and desire to secure by Letters Patent, is—

The combination of the carriage, the rollers, the coupling-pole pivotally supported midway its ends on the rollers, and having its forward end connected with the carriage, and the driver's seat or load-support secured and adjustable on the pole in rear of and to and from the rollers, substantially as set forth.

In testimony whereof I affix my signature in presence of two witnesses.

WILLIAM H. THOMAS.

Witnesses:
   D. W. EBERSOLE,
   TOUSAND FOY.